United States Patent
Gustafsson

(10) Patent No.: US 12,267,414 B2
(45) Date of Patent: Apr. 1, 2025

(54) METHOD AND SYSTEM FOR PERMITTING ONE OR MORE FEATURES ON A COMPUTER PROGRAM

(71) Applicant: Chevin Technology Holdings Limited, Cambridge (GB)

(72) Inventor: Steinn Gustafsson, Cambridge (GB)

(73) Assignee: Chevin Technology Holdings Limited, Cambridge (GB)

( * ) Notice: Subject to any disclaimer, the term of this patent is extended or adjusted under 35 U.S.C. 154(b) by 275 days.

(21) Appl. No.: 17/813,394

(22) Filed: Jul. 19, 2022

(65) Prior Publication Data
US 2023/0013780 A1    Jan. 19, 2023

(30) Foreign Application Priority Data
Jul. 19, 2021    (GB) .................................... 2110354

(51) Int. Cl.
*H04L 9/08*    (2006.01)
*H04L 9/06*    (2006.01)

(52) U.S. Cl.
CPC .......... *H04L 9/0825* (2013.01); *H04L 9/0643* (2013.01); *H04L 9/085* (2013.01); *H04L 9/0869* (2013.01)

(58) Field of Classification Search
CPC ..... H04L 9/0825; H04L 9/0643; H04L 9/085; H04L 9/0869
See application file for complete search history.

(56) References Cited

U.S. PATENT DOCUMENTS

| 2015/0242615 A1 | 8/2015 | Newell et al. |
| 2017/0041793 A1 | 2/2017 | Lee et al. |
| 2020/0372128 A1 | 11/2020 | Torres et al. |

OTHER PUBLICATIONS

Examination Report received in GB Application No. GB2110354.4, mailed Apr. 5, 2022.

*Primary Examiner* — Vance M Little
(74) *Attorney, Agent, or Firm* — Blank Rome LLP

(57) ABSTRACT

There is provided a method of permitting one or more features on a computer program. The computer program executing on a hardware with a hardware identifier. The method comprises, at the authentication server, receiving an authentication key indicating authorised features of the computer program, generating a server key based on the hardware identifier and a feature list, and comparing the authentication key with the server key. The method further comprises, at the authentication client, receiving a feature request comprising one or more features to be permitted on the computer program, generating a feature verification message based on the one or more features, and transmitting the feature verification message to the authentication server. The method further comprises, at the authentication server, receiving the feature verification message, verifying that the one or more features are within the feature list, generating a response key if the one more or more features are within the feature list and the authentication key matches the server key, and transmitting the response key to the authentication client. The method further comprises, at the authentication client, receiving the response key, and permitting the one or more features on the computer program.

20 Claims, 5 Drawing Sheets

METHOD AND SYSTEM FOR PERMITTING ONE OR MORE FEATURES ON A COMPUTER PROGRAM

TECHNICAL FIELD

The present disclosure is concerned with a method and system for permitting one or more features on a computer program running on a hardware. In particular but not exclusively, the method and system are concerned with enabling one or more features on a computer program running on a field programmable gate array (FPGA), and more particularly but not exclusively, the computer program resides in an encrypted envelope of an IP block in the FPGA.

BACKGROUND

It is important for software developers to be able to control the unauthorised use of their software products.

For example, software products are often offered to end users for evaluation, prior to purchase, so that the suitability and compatibility of the software product can be assessed. In these circumstances, software products may be supplied for evaluation for a limited amount of time, but the software product may remain with the evaluator thereafter, and may be reused without permission. The evaluation time may be considered to be a feature of the software under evaluation, and it is desirable to change the evaluation period easily in some circumstances. Also, software supplied for evaluation on one hardware may be used on different hardware without the permission of the software supplier.

In addition, software products may have a number of optional functional features that can be enabled. Often, a customer would require only a subset of the available functional features of the software. Therefore, the customer may only require a license to use particular functional features and in the future the customer may request further additional functional features to be available for evaluation or use.

Therefore, there is a need for at least one way of improving one or more of the following: controlling the continued use of software products after an evaluation period, extending the evaluation period, enabling or disabling further functional features of the software, or inhibiting the unauthorised reuse of software products on different hardware.

SUMMARY

According to a first aspect of the invention, there is provided a method of permitting one or more features on a computer program, the computer program executing on a hardware with a hardware identifier. The method comprises, at the authentication server, receiving an authentication key indicating authorised features of the computer program, generating a server key based on the hardware identifier and a feature list, and comparing the authentication key with the server key. The method further comprises, at the authentication client, receiving a feature request comprising one or more features to be permitted on the computer program, generating a feature verification message based on the one or more features, and transmitting the feature verification message to the authentication server. The method further comprises, at the authentication server, receiving the feature verification message, verifying that the one or more features are within the feature list, generating a response key if the one more or more features are within the feature list and the authentication key matches the server key, and transmitting the response key to the authentication client. The method further comprises, at the authentication client, receiving the response key, and permitting the one or more features on the computer program.

In this way, by comparing the authentication key with the generated server key, the authentication server is able to authenticate, or verify, that the feature list in the authentication server contains authorised features, i.e. features that are authorised to operate on the computer program. Additionally, the hardware identifier ensures that the authorised features relate only to features of the computer program when the computer program is running on the specific hardware. Consequently, the method disclosed herein provides the software licensor with more control over the operation of the computer program, for example, the software licensor can leverage the authentication key to control the evaluation period of a software and the availability of functional features of the software. Additionally, an evaluator would not be able to copy or move the computer program to another hardware and obtain the functionality of that computer program and associated features, without first having the licensor approve and authorise the same by issuing a new authentication key.

The server key may be further generated based on a server secret. The authentication key and the server key may each be a digest of a same one-way hash function. This allows the authentication server to authenticate the source of the authentication key by comparing the authentication key with the server key which authenticates that the source of the authentication key knows the server secret and is therefore an authorised entity. This comparison step also helps ensure that the authentication key has not been tampered with.

Generating the response key at the authentication server may be further based on a client secret. Verifying the response key at the authentication client may comprise using the client secret. Verifying the response key using the client secret may comprise generating a client key from the feature verification message and the client secret, and comparing the client key with the response key. The response key and the client key may each be a digest of a same one-way hash function. This allows the authentication client to authenticate the source of the response key through the comparison step. This comparison step also ensures that the response key has not been tampered with.

The authentication server may be in the hardware which adds an extra layer of security to the message exchange between the authentication server and the authentication client. Alternatively, the authentication server may reside external to the hardware which allows for a flexible internet-based IP licensing for any hardware that contains the authentication client.

The authentication client may not verify the response key if the response key is received more than a threshold number of clock cycles from when the client transmits the authentication verification message. The threshold number of clock cycles may be any of 1 k, 2 k, 3 k, 4 k, 5 k, 6 k or 7 k or thereabouts. In particular but not exclusively, the threshold number of clock cycles may be 4 k or thereabouts. This feature gives rise to a timeout mechanism at the authentication client. The timeout allows the one or more feature to be changed dynamically while the computer program is in operation.

The authentication client may be in an IP block of the hardware. The authentication client may be in an encrypted envelope of the IP block which secures the feature permission signal to the computer program.

According to a second aspect of the invention, there is provided a system comprising an authentication server and an authentication client configured to perform the method steps outlined above.

According to a third aspect of the invention, there is provided a method performed by an authentication server for verifying one or more features to be permitted on a computer program, the computer program executing on a hardware with a hardware identifier. The authentication server receives an authentication key. The authentication key indicates authorised features of the computer program. The authentication server generates a server key based on the hardware identifier and a feature list. The authentication server receives a feature verification message from an authentication client. The feature verification message comprises one or more features. The authentication server verifies that the one or more features are within the feature list. The authentication server generates a response key if the one more or more features are within the feature list and the authentication key matches the server key. The authentication server transmits the response key to the authentication client.

According to a fourth aspect of the invention, there is provided a computer program comprising instruction when executed by a processor cause the computer program to perform the method of the third aspect of the invention.

According to a fifth aspect of the invention, there is provided a method performed by an authentication client for permitting one or more features on a computer program, the computer program executing on a hardware with a hardware identifier. The authentication client receives a feature request comprising one or more features to be enabled on the computer program. The authentication client generates a feature verification message based on the one or more features. The authentication client transmits the feature verification message to an authentication server for verifying the one or more features. The authentication client receives a response key indicating verification of the one or more features. The authentication client permits the one or more features on the computer program.

According to a sixth aspect of the invention, there is provided a computer program comprising instruction when executed by a processor cause the computer program to perform the method of the fifth aspect of the invention.

BRIEF DESCRIPTION OF THE DRAWINGS

The invention shall now be described, by way of examples only, with reference to the accompanying drawings in which.

DETAILED DESCRIPTION

Figure 1:
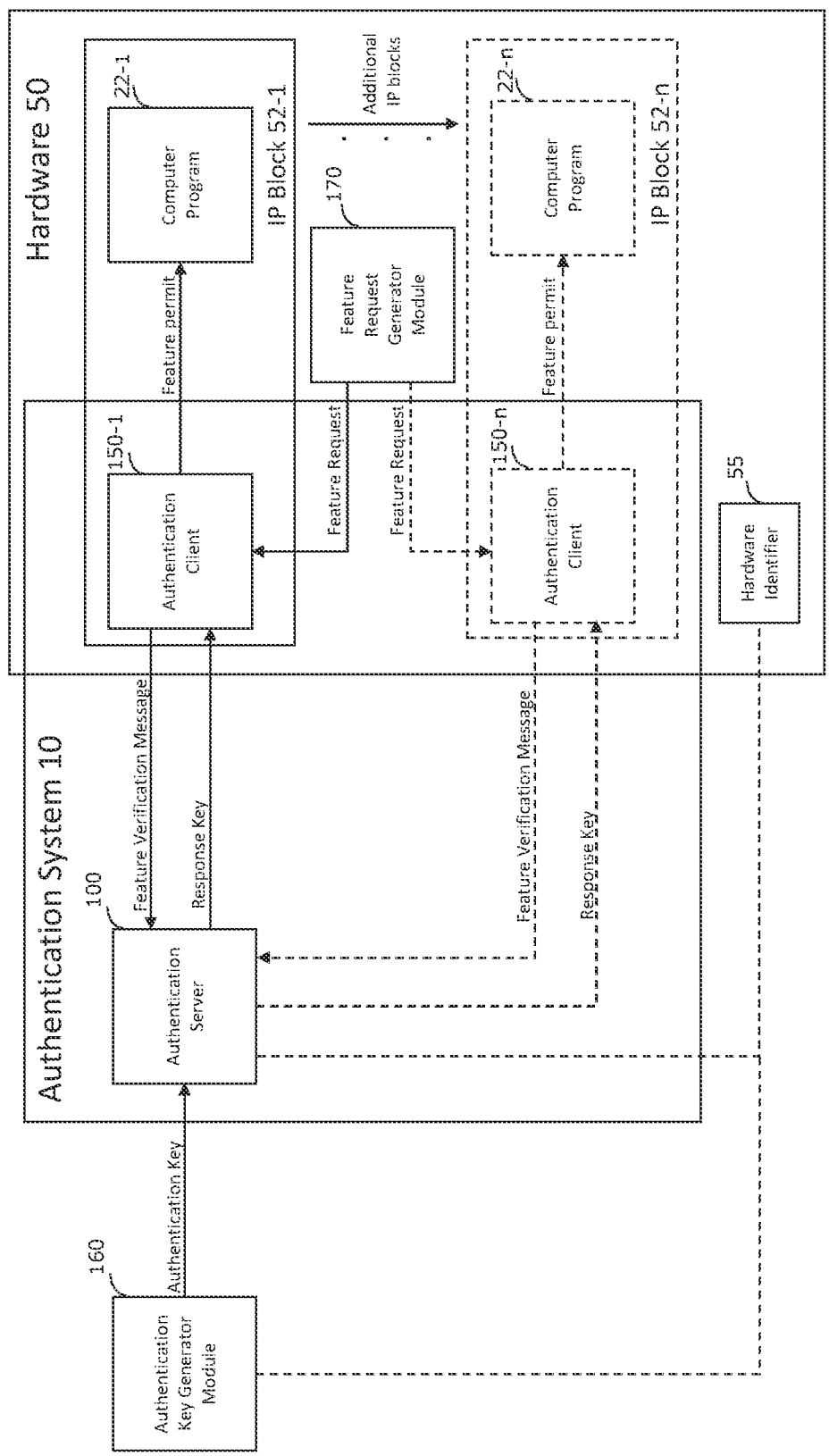
FIG. 1 is a block diagram of a hardware running a computer program, and an authentication system comprising an authentication server and an authentication client.

FIG. 1 is a block diagram illustrating an authentication system 10 configured to control one or more computer programs or software products executing on a hardware 50 (e.g., computer program 22-1 up to computer program 22-n, where n equals the number of separately authenticatable computer programs running on the hardware 50, e.g., if n equals 3 then there are three computer programs 22-1, 22-2 and 22-3 running on hardware 50, etc.). The authentication system 10 comprises an authentication server 100 and one or more authentication clients. The hardware 50 may be any type of programmable device or programmable logic device, such as, a field programmable logic array (FPGA). This disclosure is particularly useful for FPGAs, but not exclusively so. The hardware 50 may comprise a single IP block, such as, IP block 52-1 or multiple IP blocks as outlined in FIG. 1. The hardware 50 comprises a hardware identifier 55 that can be used to identify the hardware 50. The hardware identifier 55 may be a physically unclonable function. The physically unclonable function may be based on unique characteristics of the hardware 50 which helps differentiate the hardware 50 from most, if not all, other hardwares. The authentication client 150 and computer program 22-1 reside in IP block 52-1. IP block 52-1 is a semiconductor intellectual property core, IP core or IP block. The authentication client 150 resides within an encrypted envelope of the IP block. The computer program also resides within the encrypted envelope of the IP block. Hardware 50 may contain multiple IP blocks. While this example shows that the authentication client 150 resides within an encrypted envelope within an IP block, it can be understood that this may not always be necessary.

The authentication server 100 may reside within the hardware 50 or be remote from the hardware 50. For example, the authentication server 100 may be implemented in register transfer level (RTL) on the same or another hardware, or even in software residing on a remotely located computer. Having the authentication server 100 residing in a remotely located computer allows for a flexible internet-based IP licensing for software products executing on any hardware that contains an authentication client 150. For internet-based IP licensing, the authentication server 100 may communicate with the authentication client 150 over a network, for example on an Amazon Web Services (AWS) server.

The authentication server 100 receives an authentication key from an authentication key generator module 160. The authentication server 100 also receives a feature verification message from the authentication client 150. The authentication server 100 also transmits a response key to the authentication client 150.

The authentication key is typically created by the licensor or developer of the computer program. The authentication key is generated by the licensor or developer based on the hardware identifier 50 and a permitted list of features that are authorised to run on the computer program 22, which is known or input to the authentication key generator module 160. The authentication key is typically 32 bytes, however other sizes may be used.

The hardware identifier 55 is also accessible to the authentication server 100. Making the hardware identifier 55 accessible to the authentication server 100 removes the need of having to share the hardware identifier between multiple authentication clients when multiple IP block reside in the hardware. In some circumstances, the hardware identifier 55 is stored locally on the authentication server 150. Therefore, an aspect of the disclosure allows there to be a single authentication server associated with the hardware, the authentication server being able to verify that one or more features are authorised to run on a computer program running on said hardware. This disclosure also scales to multiple authentication servers, one for each of a corresponding number of hardwares.

The authentication client 150 receives the response key from the authentication server 100 and a feature request from a feature request generator module 170. The feature request generator module 170 may generate the feature request based on a request from a computer program 22 running on hardware 50. The hardware 50 may be able to generate the feature request by other means and transmit it to the authentication client 150. The authentication client 150 transmits a feature verification message to the authentication server 100 and a feature permit signal to the computer program 22.

Figure 2:
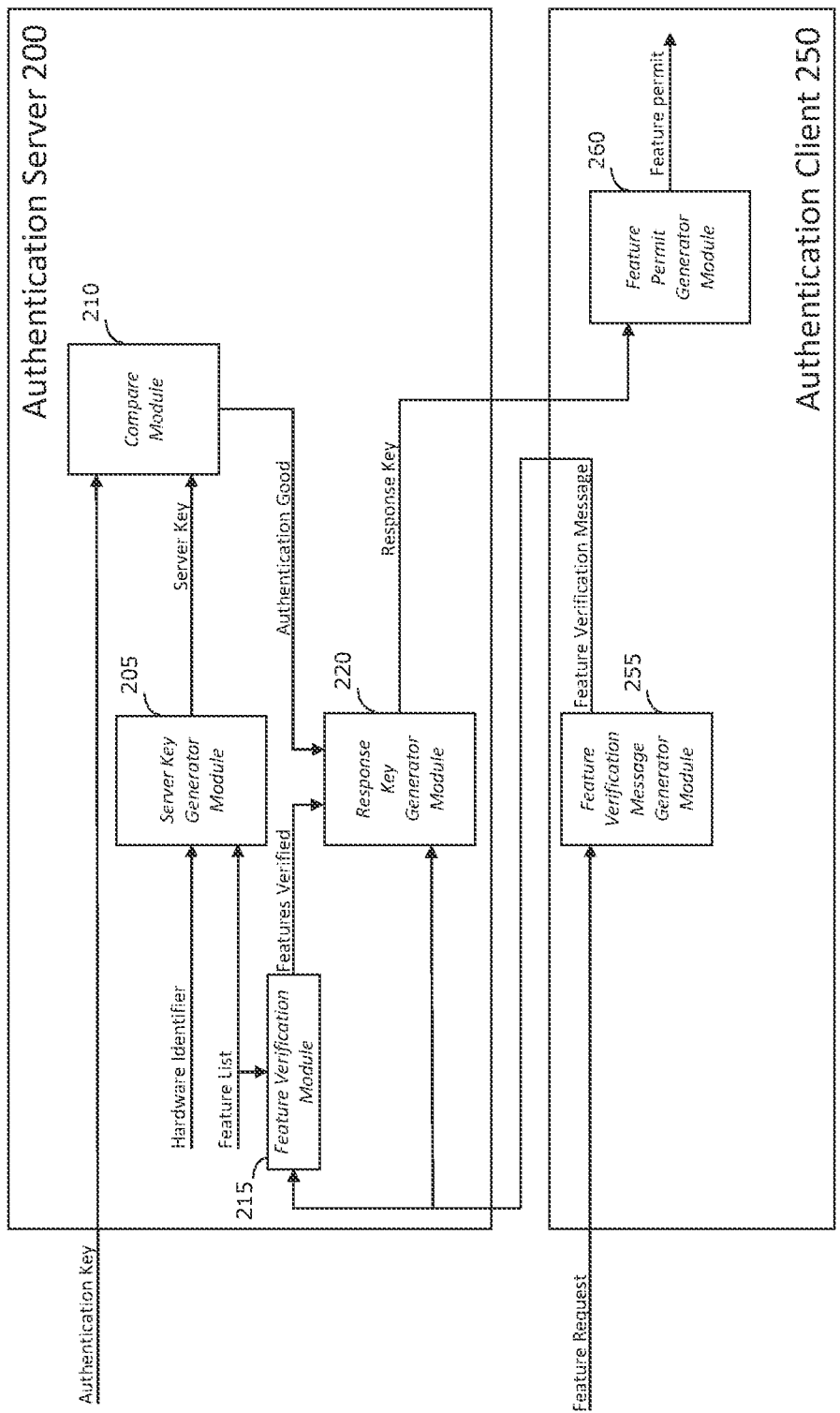
FIG. 2 is a block diagram of the authentication system of FIG. 1 in more detail.

FIG. 2 is a block diagram of the authentication system 10 of FIG. 1 in more detail. The authentication system 10 comprises authentication server (renumbered as 200 in FIG. 2) and authentication client (renumbered as 250 in FIG. 2). The authentication server 200 comprises a compare module 210, a server key generator module 205, a feature verification module 215 and a response key generator module 220. The authentication client 250 comprises a feature verification message generator module 255 and a feature permit generator module 260.

The compare module 210 of the authentication server 200 receives the authentication key and the server key. The compare module 210 compares the authentication key and the server and outputs an authentication good signal if the authentication key and server key indicate a match. Preferably, the authentication good signal is generated when the authentication key and the server key are a perfect match. However, the authentication signal may be generated if the result of the comparison of the authentication key and the server key show that the hardware identifier and the features on which both keys are based are the same.

The server key generator module 205 receives the hardware identifier and a feature list. The feature list contains one or more features which comprise an identifier relating to the authentication client 250 and features stored on the authentication server 200 that are permitted to run on the computer program 22. The identifier may be a client identifier or an IP block identifier to identify the IP block in which the authentication client 250 and the computer program 22 resides. The feature list can be reprogrammed on the authentication server 200 at any time, but the feature list must be verified by the authentication key as discussed above. Based on the hardware identifier and the feature list, the server key generator module 205 generates the server key and transmits the server key to the compare module 210. The authentication server 200 may generate the server key whenever it detects any change to the authentication key or the feature list which allows for a dynamic update of the features that are permitted to run on computer program 22.

The authentication server 200 receives a feature verification message from the authentication client 250. The feature verification message comprises one or more features. The one or more features describe function or behaviour that are requested to be authorised or allowed to run on the computer program 22. A feature may be represented by an 8-byte hash or token. The authentication server 200 typically treats every feature the same way, with no special cases. The feature verification message is received at a feature verification module 215 so that the one or more features of the feature verification message are to be verified that they are within the feature list of the authentication server 100. If the one or more features are within the feature list then the feature verification module outputs a feature verified signal. A response key generator module 220 also receives the feature verification message and generates a response key based on the feature verification message if the response key generator module 220 receives a features verified signal from the feature verification module 215 and an authentication good signal from the compare module 210. The response key is transmitted to the authentication client 250. If the response key generator module 220 does not receive a features verified signal from the feature verification module 215 and/or an authentication good signal from the compare module 210 then the response key generator module 220 will not generate the response key.

The authentication client 250 is arranged to receive a feature request, the feature request comprises one or more features. The one or more features may comprise an identifier and feature IDs corresponding to the features to be permitted on the computer program. The identifier may be a client identifier and/or an IP block identifier. At a feature verification message generator module 255, the authentication client 250 generates the feature verification message based on the feature request and transmits the feature verification message to authentication server 200. The authentication client 250 receives a response at a feature permit generator module 260 and outputs a feature permit signal which is transmitted to the computer program 22 to indicate that the one more features of the feature request are permitted to run.

Figure 3:
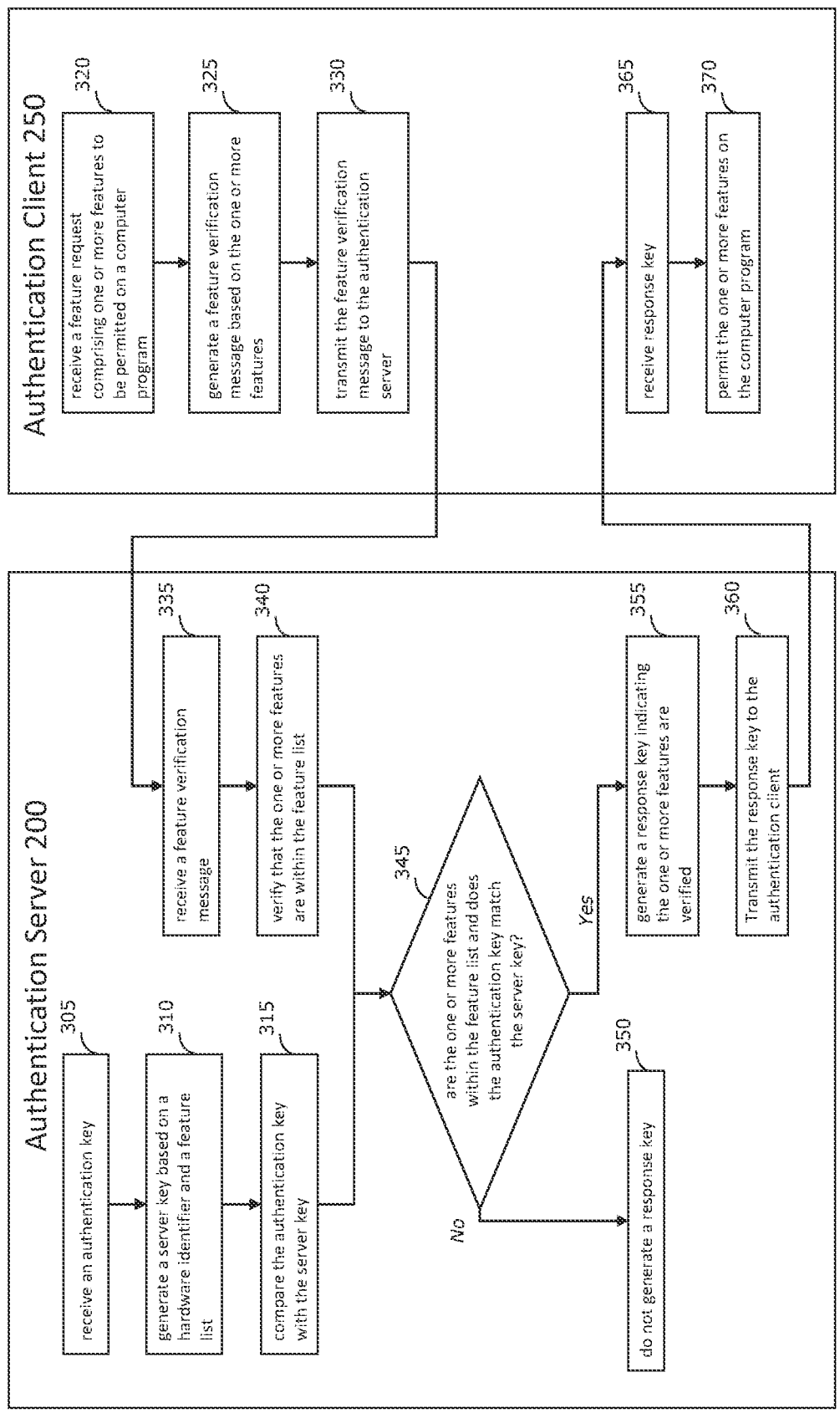
FIG. 3 is a flow chart of a method of permitting one or more features on the computer program of FIG. 1.

FIG. 3 is a flow chart illustrating a method of permitting one or more features on the computer program 22 of FIG. 1. At step 305, the authentication server 200 receives an authentication key. The authentication key indicates features that are authorised to run on the computer program 22. At step 310, the authentication server 200 generates a server key based on a hardware identifier and a feature list. At step 315, the authentication server 200 compares the authentication key and the server key. At step 335, the authentication server 100 receives a feature verification message. At step 340, the authentication server 100 verifies that the one or more features are within the feature list. At step 345, the authentication server 200 determines if the one or more features are within the feature list and if the authentication key matches the server key. If the one or more features are not within the feature list and/or the authentication key does not match the server key the method proceeds to step 350 to not generate a response key. However, if the one or more features are within the feature list and the authentication key matches the server key then method proceeds to step 355. At step 355, the authentication server 200 generates a response key indicating the one or more features are verified. At step 360, the authentication server 200 transmits the response key to the authentication client 250.

At step 320, the authentication client 250 receives a feature request comprising one or more features to be permitted on computer program 22. At step 325, the authentication client 250 generates a feature verification message based on the one or more features. At step 330, the authentication client 250 transmits the feature verification message to the authentication server 200. At step 365, the authentication client 250 receives a response key, the response key indicates that the one or more features on the feature verification message are authorised to run on the computer program 22. At step 370, the authentication client permits the one or more features on the computer program 22.

Figure 4:
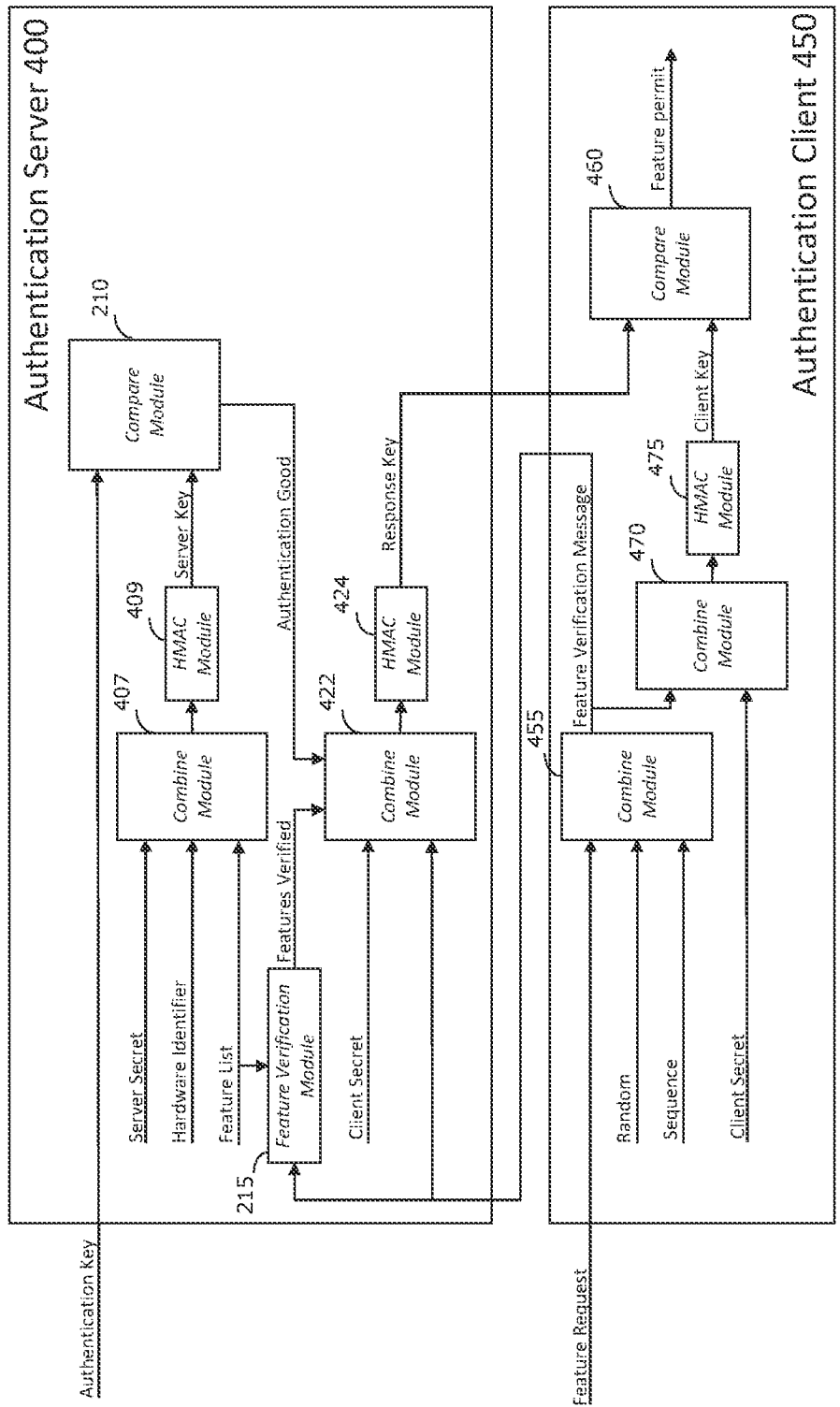
FIG. 4 is a block diagram of another authentication system suitable for use with the computer hardware of FIG. 1, comprising an authentication server and an authentication client.

FIG. 4 is a block diagram of another authentication system suitable for use with the hardware 50 of FIG. 1, comprising an authentication server 400 and an authentication client 450. The authentication server 400 comprises a compare module 210, a combine module 407, a HMAC module 409, a feature verification module 215, a combine module 422 and a HMAC module 424. The authentication client 450 comprises a combine module 455, a combine module 470, a HMAC module 475 and a compare module 460.

The authentication server 400 comprises the compare module 210 of FIG. 2. The compare module 210 receives an authentication key and a server key. The received authentication key may be generated by the licensor or developer based on a server secret in addition to the hardware identifier and the permitted list of features that are authorised to run on the computer program as discussed with reference to FIG. 1.

The server key generator module 205 of FIG. 2 is substituted by the combine module 407 and HMAC module 409. The combine module 407 receives a server secret, a hardware identifier and a feature list and combines them. HMAC module 409 applies a Hash-based Message Authentication Code (HMAC) to the combined server secret, hardware identifier and feature list to generate a server key and transmits the server key to compare module 210. The Hash-based Message Authentication Code used herein may be any one-way hash function such as SHA-1, SHA-256, md5 or scrypt, producing 20 to 32 bytes of digest.

The compare module 210 compares the authentication key and the server and outputs an authentication good signal if the authentication key and server key are considered to match. Preferably, the authentication good signal is generated when the authentication key and the server key are a perfect match. However, the authentication signal may be generated if the result of the comparison of the authentication key and the server key show that the server secret, the hardware identifier and the features on which both keys are generated are the same. The authentication server 400 receives a feature verification message from the authentication client 450. The feature verification message comprises one or more features. The feature verification message is received at the feature verification module 215 so that the one or more features of the feature verification message can be checked to verify that they are within the feature list of the authentication server 400. If the one or more features are within the feature list then the feature verification module 215 outputs a feature verified signal.

The response key generator module 220 of FIG. 2 is substituted by the combine module 422 and HMAC module 424. The combine module 422 also receives the feature verification message and combines it with a client secret if it receives a features verified signal and an authentication good signal. The HMAC module 424 applies a one way hash function to the combined feature verification message and client secret to generate a response key and transmits the response key to the authentication client 450. In this example, the response key contains a 10-byte hashed result. The 10-byte hashed result provides a balance between making brute force attack impractical (by increasing the number of possible combinations required to guess the hashed result), and reducing the computational power required to process the hashed-result. In other examples, the response key contains a 32-byte hashed result from SHA-256/scrypt, a 20-byte hashed result from SHA-1, or a 16-byte hashed result from MD5.

The authentication client 450 receives a feature request, the feature request comprises one or more features. The feature verification message generator module 255 of FIG. 2 is substituted by combine module 455. The combine module 455 receives the feature request, random data and a sequence and combines them to generate a feature verification message. The feature verification message is typically 32 bytes, but could be another size as needed. The random data increases state space and security against rainbow table attacks by making it difficult for an attacker to create a meaningful rainbow table. The authentication server 400 expects and will respond only to incrementing sequence numbered feature verification messages. The sequence could be an incrementing time sequence or number sequence representing the incremental number of feature verification messages that have already been sent. This limits each feature defined in the authentication server 400 to the single authentication client 450. If multiple authentication clients with the same identifier share the authentication server 400 then a different feature IDs must be used for each one. This means that several feature IDs can be mapped for the same one or more features that are to be permitted in a computer program.

The feature verification message generated may also contain a vendor ID which is used to index one of several client secrets indexed in the authentication server 400 when the hardware 50 comprises multiple authentication clients. This provides a mechanism to support authentication clients from more than one vendor, where each vendor is assigned a different client secret.

The feature verification message is transmitted to the authentication server 400. Combine module 470 combines the feature verification message with a client secret. HMAC module 475 applies a one way hash function to the combined feature verification message and client secret to generate a client key. The authentication client 450 receives the response key from the authentication server 400. Compare module 460 compares the response key with the client key and if they match the compare module generates a feature permit signal.

It is important to note that the secrets are never exchanged but remain at both server and clients sides, and are combined with the messages transmitted in between before a hash function is applied.

Figure 5:
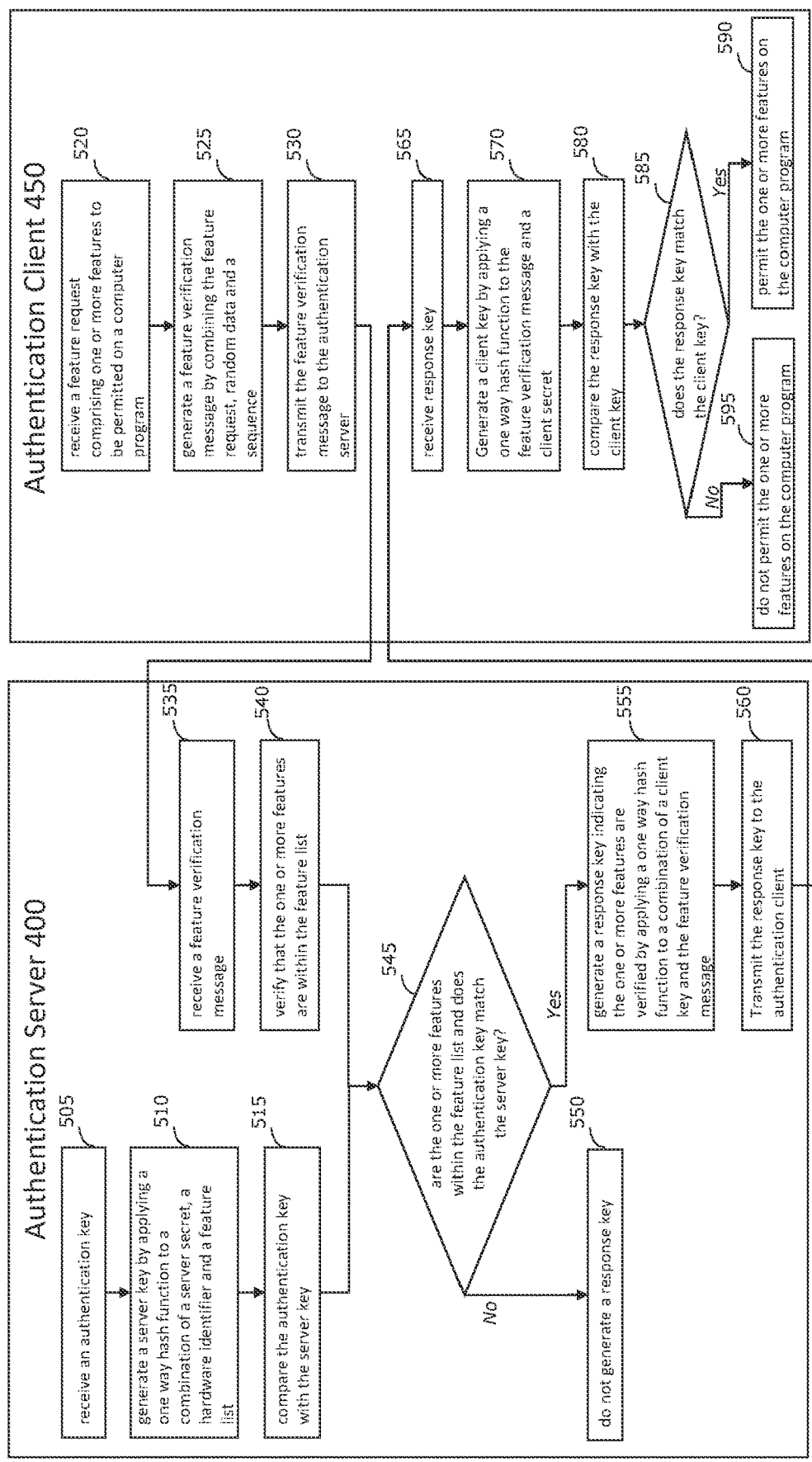
FIG. 5 is a flow chart of another method of permitting one or more features on the computer program of FIG. 1.

FIG. 5 is a flow chart illustrating another method of permitting one or more features on the computer program 22 of FIG. 1 in correspondence with the authentication system of FIG. 4. At step 505, the authentication server 400 receives an authentication key. At step 510, the authentication server 400 generates a server key based on a server secret, a hardware identifier and a feature list. At step 515, the authentication server 400 compares the authentication key and the server key. At step 535, the authentication server 400 receives a feature verification message. At step 540, the authentication server 400 verifies that the one or more features are within the feature list. At step 545, the authentication server 100 determines if the one or more features are within the feature list and if the authentication key matches the server key. If the one or more features are not within the feature list and/or the authentication key does not match the server key the method proceeds to step 550 to not generate a response key. However, if the one or more features are within the feature list and the authentication key matches the server key then method proceeds to step 555. At step 555, the authentication server 400 generates a response key indicating the one or more features are verified. At step 560, the authentication server 100 transmits the response key to the authentication client 450.

At step 520, the authentication client receives a feature request comprising one or more features to be permitted on computer program 140. At step 525, the authentication client 450 generates a feature verification message by combining the feature request, random data and a sequence. At step 530, the authentication client 450 transmits the feature verification message to the authentication server 400. At step 565, the authentication client 450 receives a response key. At step 570, the authentication client 450 generates a client key by applying a one way hash function to the feature verification message and a client secret. At step 580, the authentication client 450, compares the response key with the client key. At step 585, the authentication client 450 determines if the response key matches the client key. If the response key does not match the client key then the method proceeds to step 595 to not permit the one or more features on the computer program. However, if the response key and the client key match then the method proceeds to step 590 to permit the one or more features on the computer program.

The above embodiments are to be understood as illustrative examples. Further embodiments are envisaged. It is to be understood that any feature described in relation to any one embodiment may be used alone or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

A purpose of the embodiments is to authenticate, authorize and verify features to run in software.

The disclosed embodiments do not require encryption because the secret is never transferred. The information we do send does not need to be secret, e.g. a hash of features from the features list. Modifying the list would be rejected by the hash checker. An attacker would need to be able to break a strong hash (which can be made very strong), or be in possession of the secret (placed in a trusted environment, e.g. burn-in at time of production) to spoof responses.

An innovative aspect of this disclosure is the possibility to authorize the use of different features and do so without requiring a central repository containing sensitive or secret information relating to a license. Rather the disclosed technology ensures that the central repository is legitimate and can be trusted to authorize some feature or action and does not need to contain sensitive or secret information relating to a license. The trust is inferred at client side, when a client observes the servers' ability to solve challenges (e.g. HMAC challenges), something it would only be able to do correctly and quickly if it has knowledge of the server secret. The HMAC challenges may also contain tokens (feature requests/authorisations) which the client uses to determine features to run from its local set of rules.

A contribution of this technology is to abstract the meaning of what is being authorized, reducing it down to simple tokens, which only have any meaning at the client side. The absence of encryption logic saves a large number of gates. Not only does this make the method very compact and secure, since useful data cannot be intercepted, but allows the token's meaning to be defined at a later stage. This is particularly useful when used to protect multiple vendors' software within a system because it does not impose any particular way to manage licenses.

The name authentication client/server highlights the purpose is more than the use-case of enforcing licenses, such as protecting IP blocks. It is also very useful to control access to features that need to be protected from intentional or accidental enabling or disabling, to prevent damage or loss in safety or mission critical applications for example.

No secret information is transferred between client/server, therefore there is no need for encrypted communications.

When used for licensing, any sensitive information resides at the client side, and need not be exchanged between server/client.

Authentication and authorization uses hashed tokens, optionally using arbitrarily selected numbers to represent some feature. Hence the tokens can be stored in a small list, that does not require special secure communications or large off chip storage. The amount of information is small enough to be kept in ROM on suitable devices, or as a non-encrypted constant inside program memory for example.

Hashed tokens only have meaning at the authentication client side. The authentication server may simply have a list of numbers and client identifiers.

The physically unclonable function is required only when authentication and authorization must be limited to a single identifiable hardware.

Usefully, a single variable is to be kept secret on each authentication client as the client secret, matching the client secret stored on the authentication server. This is typically an arbitrarily chosen number, for example a 64 bit random number. The server secret can also be an arbitrarily chosen number stored in secret at the authentication server and known to the generator of the authentication key.

The invention claimed is:

1. A method of permitting one or more features on a computer program, the computer program executing on a hardware with a hardware identifier, the method comprising:
   at an authentication server:
      receiving an authentication key, wherein the authentication key indicates authorised features of the computer program,
      generating a server key based on the hardware identifier, a server secret and a feature list, and
      comparing the authentication key with the server key;
   at an authentication client:
      receiving a feature request comprising one or more features to be permitted on the computer program,
      generating a feature verification message based on the one or more features, and
      transmitting the feature verification message to the authentication server;
   at the authentication server:
      receiving the feature verification message,
      verifying that the one or more features are within the feature list,
      generating a response key based on a client secret if the one more or more features are within the feature list and the authentication key matches the server key, and
      transmitting the response key to the authentication client; and
   at the authentication client:
      receiving the response key,
      verifying the response key using the client secret, and
      permitting the one or more features on the computer program.

2. The method of claim 1, wherein the authentication key and the server key are each a digest of a same one-way hash function.

3. The method of claim 1, wherein verifying the response key using the client secret comprises generating a client key from the feature verification message and the client secret, and comparing the client key with the response key.

4. The method of claim 3, wherein the response key and the client key are each a digest of a same one-way hash function.

5. The method of claim 1, wherein the feature verification message is further generated based on a random data and a sequence.

6. The method of claim 1, wherein the authentication server is in the hardware.

7. The method of claim 1, wherein the authentication server is external to the hardware.

8. The method of claim 1, wherein the authentication client does not verify the response key if the response key is received more than a threshold number of clock cycles from when the client transmits the authentication verification message.

9. The method of claim 1, wherein the authentication client is in an IP block of the hardware.

10. The method of claim 9, wherein the authentication client is in an encrypted envelope of the IP Block.

11. A method performed by an authentication server for verifying one or more features to be permitted on a computer program, the computer program executing on a hardware with a hardware identifier, the method comprising:
   receiving an authentication key, wherein the authentication key indicates authorised features of the computer program;
   generating a server key based on the hardware identifier, server secret and a feature list;
   receiving a feature verification message from an authentication client, wherein the feature verification message comprises one or more features;
   verifying that the one or more features are within the feature list;
   generating a response key based on a client secret if the one or more features are within the feature list and the authentication key matches the server key; and
   transmitting the response key to the authentication client.

12. The method of claim 11, wherein the authentication key and the server key are each a digest of a same one-way hash function.

13. The method of claim 11, wherein the authentication server is in the hardware.

14. A method performed by an authentication client for permitting one or more features on a computer program, the computer program executing on a hardware, the method comprising:
   receiving a feature request comprising one or more features to be enabled on the computer program;
   generating a feature verification message based on the one or more features;
   transmitting the feature verification message to an authentication server for verifying the one or more features;
   receiving a response key, wherein the response key is generated at the authentication server based on a client secret and in response to: the one or more features being within a feature list; and an authentication key of the authentication server matching a server key of the authentication server, and wherein the server key is generated based on a hardware identifier, a server secret, and the feature list;
   verifying the response key using the client secret, wherein the response key indicates verification of the one or more features; and
   permitting the one or more features on the computer program.

15. The method of claim 14, wherein verifying the response key using the client secret comprises generating a client key from the feature verification message and the client secret, and comparing the client key with the response key.

16. The method of claim 14, wherein the response key and the client key are each a digest of a same one-way hash function.

17. The method of claim 14, wherein the feature verification message is further generated based on a random data and a sequence.

18. The method of claim 14, wherein the authentication client does not verify the response key if the response key is received more than a threshold number of clock cycles from when the client transmits the authentication verification message.

19. The method of claim 14, wherein the authentication client is in an IP block of the hardware.

20. The method of claim 19, wherein the authentication client is in an encrypted envelope of the IP Block.

* * * * *